US011238231B2

(12) United States Patent
Johnson et al.

(10) Patent No.: US 11,238,231 B2
(45) Date of Patent: Feb. 1, 2022

(54) DATA RELATIONSHIPS IN A QUESTION-ANSWERING ENVIRONMENT

(71) Applicant: International Business Machines Corporation, Armonk, NY (US)

(72) Inventors: David L. Johnson, Pine Island, MN (US); Brian R. Muras, Otsego, MN (US); Daniel J. Strauss, Rochester, MN (US); Eric G. Thiemann, Owatonna, MN (US)

(73) Assignee: International Business Machines Corporation, Armonk, NY (US)

( * ) Notice: Subject to any disclaimer, the term of this patent is extended or adjusted under 35 U.S.C. 154(b) by 280 days.

(21) Appl. No.: 16/275,798

(22) Filed: Feb. 14, 2019

(65) Prior Publication Data
US 2019/0179904 A1    Jun. 13, 2019

Related U.S. Application Data

(63) Continuation of application No. 14/566,111, filed on Dec. 10, 2014, now Pat. No. 10,289,679.

(51) Int. Cl.
*G06F 16/28* (2019.01)
*G06F 16/332* (2019.01)
(Continued)

(52) U.S. Cl.
CPC ............ *G06F 40/30* (2020.01); *G06F 16/288* (2019.01); *G06F 16/3329* (2019.01); *G06F 40/211* (2020.01); *G06F 40/40* (2020.01)

(58) Field of Classification Search
CPC .... G06F 17/271; G06F 17/2785; G06F 17/28; G06F 17/2705; G06F 17/30598;
(Continued)

(56) References Cited

U.S. PATENT DOCUMENTS 6,482,156 B2 * 11/2002 Iliff ........................ G16H 70/20
600/300
6,641,532 B2 * 11/2003 Iliff ........................ H04M 3/493
600/300
(Continued)

FOREIGN PATENT DOCUMENTS

WO       03060750 A2    7/2003
WO    2007024617 A2    3/2007
(Continued)

OTHER PUBLICATIONS

Müller et al., "The diagnosis related groups enhanced electronic medical record", International Journal of Medical Informatics (2003) 70, 221-228, © 2003 Elsevier Ireland Ltd. DOI: 10.1016/S1386-5056(03)00050-9.

(Continued)

*Primary Examiner* — Pierre M Vital
*Assistant Examiner* — Vy H Ho
(74) *Attorney, Agent, or Firm* — James L. Olsen

(57) ABSTRACT

A computer-implemented method of establishing influence relationships between data in a question-answering environment is disclosed. Establishing influence relationships can include determining a set of conditions indicating a set of user statuses and analyzing, using a first natural language processing technique, a corpus of data including a set of user data. Establishing influence relationships between data can include identifying, based on analyzing the corpus of data, a set of influence factors corresponding to a subset of the set of user data and to a subset of the set of conditions. In embodiments, establishing influence relationships can include establishing, based on the set of influence factors, a set of influence relationships between the subset of the set of user data and the subset of the set of conditions.

4 Claims, 5 Drawing Sheets

(51) Int. Cl.
*G06F 40/30* (2020.01)
*G06F 40/40* (2020.01)
*G06F 40/211* (2020.01)

(58) Field of Classification Search
CPC ......... G06F 17/30864; G06F 17/30876; G06F 19/363; G06F 17/277; G06F 17/3043; G06F 17/30528; G06F 17/3053; G06F 17/30595; G06F 17/30654; G06F 17/30663; G06F 17/30734; G06F 17/30867; G06F 17/3097; G06F 19/325; G06F 7/588; G06F 17/30604; G06F 8/30; G06F 12/0866; G06F 17/30; G06F 17/30345; G06F 17/30643; G06F 17/30699; G06F 19/322; G06F 19/324; G06F 19/328; G06F 19/3406; G06F 19/345; G06F 19/3456; G06F 1/1626; G06F 21/79; G06F 21/86; G06F 2212/2022; G06F 2221/2129; G06F 40/30; G06F 19/288; G06F 16/3329; G06F 40/40; G06F 40/211
See application file for complete search history.

(56) References Cited

U.S. PATENT DOCUMENTS

| | | | |
|---|---|---|---|
| 7,725,328 B1 | 5/2010 | Sumner, II et al. | |
| 8,050,938 B1 * | 11/2011 | Green, Jr | G16H 40/20 705/2 |
| 8,856,156 B1 * | 10/2014 | McNair | G06N 5/02 707/756 |
| 9,026,529 B1 | 5/2015 | Osofsky et al. | |
| 9,092,802 B1 | 7/2015 | Akella | |
| 9,536,051 B1 * | 1/2017 | Kabir | G16H 50/70 |
| 9,715,542 B2 | 7/2017 | Lu et al. | |
| 2003/0233250 A1 | 12/2003 | Joffe et al. | |
| 2004/0049505 A1 * | 3/2004 | Pennock | G06F 16/30 |
| 2004/0260577 A1 * | 12/2004 | Dahlin | G16H 10/60 705/2 |
| 2005/0065813 A1 * | 3/2005 | Mishelevich | G16H 50/30 705/2 |
| 2005/0108001 A1 | 5/2005 | Aarskog | |
| 2005/0177403 A1 | 8/2005 | Johnson | |
| 2006/0253300 A1 * | 11/2006 | Somberg | G16H 40/20 705/2 |
| 2007/0061393 A1 * | 3/2007 | Moore | G06Q 10/10 709/201 |
| 2007/0197882 A1 * | 8/2007 | Smith | G16H 70/60 600/300 |
| 2008/0146334 A1 | 6/2008 | Kil | |
| 2009/0089086 A1 * | 4/2009 | Schoenberg | G16H 80/00 705/2 |
| 2009/0112623 A1 * | 4/2009 | Schoenberg | G06Q 10/02 705/2 |
| 2009/0119095 A1 | 5/2009 | Beggelman et al. | |
| 2010/0222649 A1 * | 9/2010 | Schoenberg | G16H 40/67 600/301 |
| 2010/0324927 A1 | 12/2010 | Tinsley | |
| 2010/0332511 A1 | 12/2010 | Stockton et al. | |
| 2011/0196704 A1 | 8/2011 | Mansour | |
| 2012/0096391 A1 * | 4/2012 | Smith | G16H 50/20 715/780 |
| 2012/0102405 A1 * | 4/2012 | Zuckerman | G16H 10/20 715/733 |
| 2012/0197876 A1 | 8/2012 | Morris et al. | |
| 2012/0232743 A1 * | 9/2012 | Singh | G06Q 10/20 701/29.9 |
| 2013/0085781 A1 * | 4/2013 | Navani | G16H 10/60 705/3 |
| 2013/0204876 A1 * | 8/2013 | Szucs | G06F 16/94 707/738 |
| 2013/0210866 A1 * | 8/2013 | Pardo | A61K 9/28 514/352 |
| 2013/0218884 A1 | 8/2013 | McConnell et al. | |
| 2013/0226601 A1 * | 8/2013 | Razmi | G16H 10/20 705/2 |
| 2013/0325508 A1 * | 12/2013 | Johnson | G16H 10/65 705/3 |
| 2014/0081659 A1 * | 3/2014 | Nawana | A61B 5/1118 705/3 |
| 2014/0122185 A1 | 5/2014 | Rai et al. | |
| 2014/0136216 A1 * | 5/2014 | Beebe | G06Q 40/08 705/2 |
| 2014/0156308 A1 | 6/2014 | Ohnemus et al. | |
| 2014/0195168 A1 * | 7/2014 | Shaikh | G16H 50/20 702/19 |
| 2014/0229293 A1 | 8/2014 | Huang et al. | |
| 2014/0257852 A1 | 9/2014 | Walker et al. | |
| 2014/0271721 A1 * | 9/2014 | Walser | G01N 33/483 424/275.1 |
| 2015/0066539 A1 * | 3/2015 | Sheffer | G16H 50/20 705/3 |
| 2015/0161331 A1 * | 6/2015 | Oleynik | G16H 20/00 705/3 |
| 2015/0193583 A1 | 7/2015 | McNair et al. | |
| 2016/0098387 A1 | 4/2016 | Bruno et al. | |
| 2016/0117485 A1 | 4/2016 | Allen et al. | |
| 2016/0170962 A1 | 6/2016 | Johnson et al. | |
| 2016/0171088 A1 | 6/2016 | Johnson et al. | |
| 2016/0188648 A1 | 6/2016 | Malcolm | |
| 2016/0216274 A1 * | 7/2016 | Kain | G01N 33/6842 |
| 2016/0275253 A1 * | 9/2016 | Shimura | G16H 50/20 |

FOREIGN PATENT DOCUMENTS

WO 2007067078 A1 6/2007
WO 2010042947 A2 4/2010

OTHER PUBLICATIONS

Zheng, K., "Clinical Decision-Support Systems", Encyclopedia of Library and Information Sciences, Third Edition, pp. 1-9, Copyright © 2010 Taylor & Francis. DOI: 10.1017/E-ELIS3-120044944.
IBM, List of IBM Patents or Patent Applications Treated as Related, Feb. 14, 2019, 2 pages.

* cited by examiner

DATA RELATIONSHIPS IN A QUESTION-ANSWERING ENVIRONMENT

BACKGROUND

The present disclosure relates to question-answering techniques, and more specifically, to establishing relationships between data in a question-answering environment.

Question-answering (QA) systems can be designed to receive input questions, analyze them, and return applicable answers. Using various techniques, QA systems can provide mechanisms for searching corpora (e.g., databases of source items containing relevant content) and analyzing the corpora to determine answers to an input question.

SUMMARY

According to embodiments of the present disclosure, a computer-implemented method of establishing influence relationships between data in a question-answering environment is disclosed. The method can include determining a set of conditions indicating a set of user statuses, and analyzing, using a first natural language processing technique, a corpus of data including a set of user data. The method can include identifying, based on analyzing the corpus of data, a set of influence factors corresponding to a subset of the set of user data and to a subset of the set of conditions. The method can include establishing, based on the set of influence factors, a set of influence relationships between the subset of the set of user data and the subset of the set of conditions.

Embodiments of the present disclosure are directed towards a system for establishing influence relationships between data in a question-answering environment. The system can include a processor, a computer readable storage medium having program instructions embodied therewith. The program instructions can be executable by the processor to cause the system to determine a set of conditions indicating a set of user statuses and analyze, using a first natural language processing technique, a corpus of data including a set of user data. The program instructions can cause the system to identify, based on analyzing the corpus of data, a set of influence factors corresponding to a subset of the set of user data and to a subset of the set of conditions. The program instructions can cause the system to establish, based on the set of influence factors, a set of influence relationships between the subset of the set of user data and the subset of the set of conditions.

Embodiments of the present disclosure are directed towards a computer program product for establishing influence relationships between data in a question-answering environment. The computer program product can include a computer readable storage medium having program instructions embodied therewith. The program instructions can be executable by a computer to cause the computer to perform a method. In embodiments, the method can include determining a set of conditions indicating a set of user statuses and analyzing, using a first natural language processing technique, a corpus including a set of user data. The method can include identifying, based on analyzing the corpus, a set of influence factors corresponding to a subset of the set of user data and to a subset of the set of conditions. In embodiments, the method can include establishing, based on the set of influence factors, a set of influence relationships between the subset of the set of user data and the subset of the set of conditions.

The above summary is not intended to describe each illustrated embodiment or every implementation of the present disclosure.

BRIEF DESCRIPTION OF THE SEVERAL VIEWS OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
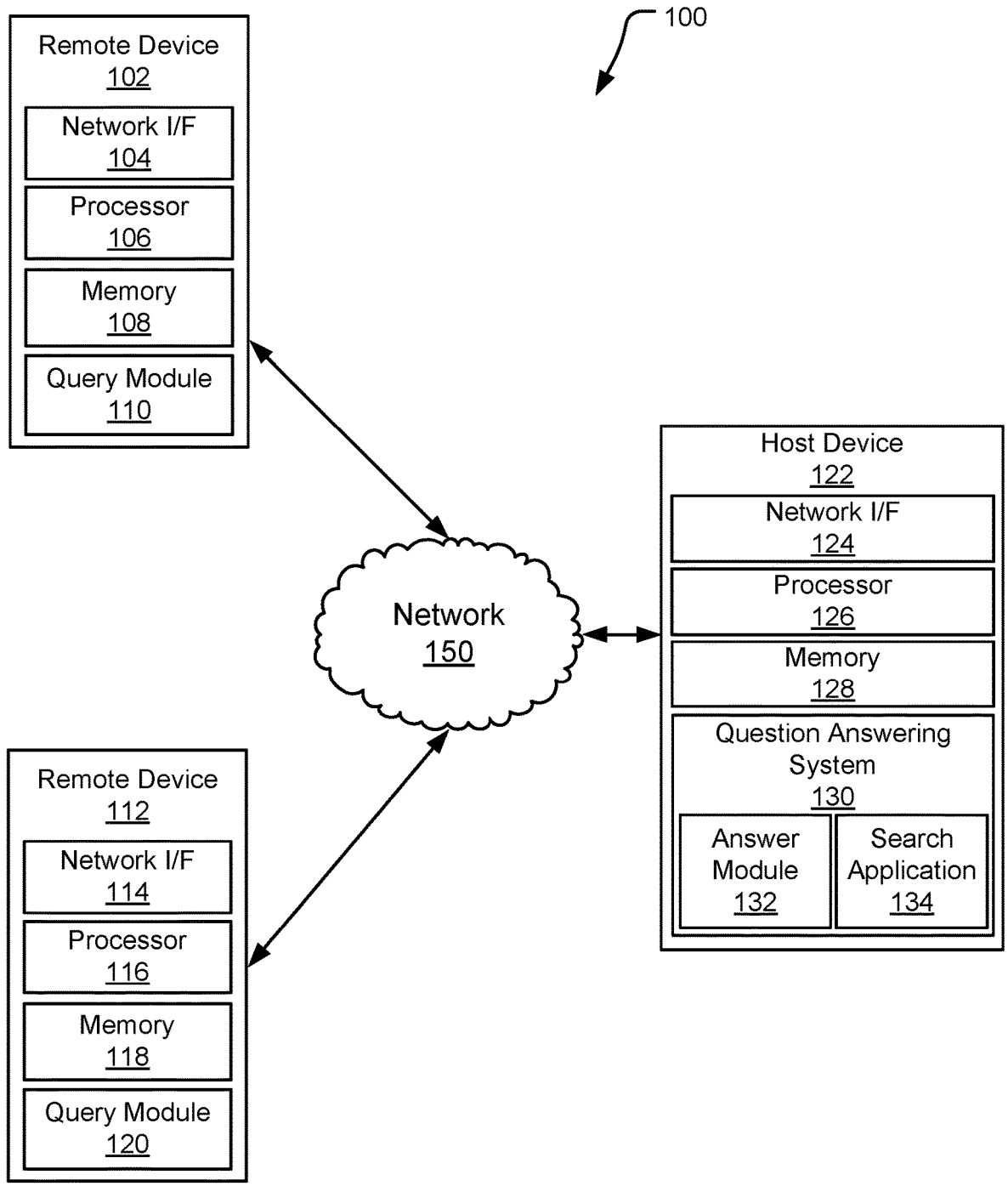
FIG. 1 depicts a block diagram of an example computing environment for use with a question-answering (QA) system, according to embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to question-answering techniques, more particular aspects relate to establishing relationships between a set of user data and a set of conditions indicating various user statuses. While the present disclosure is not necessarily limited to such applications, various aspects of the disclosure may be appreciated through a discussion of various examples using this context.

Embodiments of the present disclosure are directed towards a method of establishing influence relationships between data in a question-answering environment. In a QA system, answers can be generated in response to input queries (e.g., questions). For example, the QA system can be configured to receive an input query, analyze one or more data sources, and based on the analysis, generate answers. In embodiments, answers can be data in various forms including, but not limited to, text, documents, images, video, and audio.

In embodiments, answers could include possible explanations (e.g., causes) for various conditions. For example, the QA system could receive a question asking for possible explanations for a particular illness based on patient data.

In some instances in the medical field, when a patient seeks medical care, data about the patient can be collected by a health care provider to help explain possible conditions either currently affecting the patient or to identify possible future conditions. For example, a health care provider could survey the patient with questions related to the patient's spending habits, travel habits, medical history, or other suitable patient data to attempt to ascertain explanations or causes for potential conditions. However, in some instances patient data can be difficult to collect. For example, the patient may not know or remember sought after data. Further, the number of questions used to obtain patient data can be limited due to time constraints and/or customer service concerns.

Thus, a QA system could be configured to provide answers including explanations of how various types of data, such as patient data and a set of conditions, are connected. For example, the system could be configured to establish relationships between user data and conditions, and, based on established relationships, provide explanations on how the data is connected. In embodiments, the system could be configured to determine a causal relationship between the user data and the set of conditions, such that the system indicates that user data can cause one or more of the set of conditions.

The method can include determining a set of conditions indicating a set of user statuses and analyzing, using a natural language processing technique, a corpus of data including a set of user data. The set of conditions can indicate various statuses of a user. In embodiments, the set of conditions can indicate various actual or possible statuses of the user with regard to the user's health or medical state. For example, the set of conditions could include various illnesses such as influenza, food poisoning, cold, giardia, etc. In some examples, the set of conditions could include various symptoms such as a fever, cough, headache, etc. In some embodiments, conditions could include other various statuses such as, busy, stressed, elated, etc.

The set of user data can include various data related to a user. In embodiments, the set of user data can include electronic user information such as user accounts (bank accounts, credit cards, etc.), social media information, public records, and other electronic information associated with the user. In embodiments, the set of user data can include financial information such as spending habits, bank statements, credit card statements, credit history, and other financial information. In some embodiments, user data can include travel information including information locations and durations of user travel. In some embodiments, user data can include social media data including social network posts, pictures, video, or other information posted on various social networks. In some embodiments, user data can include geographic data including the user's home address, work address, or other information related to the geographic location of the user.

The method can include identifying, based on analyzing the corpus of data, a set of influence factors corresponding to a subset of the set of user data and to a subset of the set of conditions. Described further herein, an influence factor can be one or more shared characteristics identified in the set of user data and in the set of conditions, where the one or more shared characteristics are understood as possible consequences of the data. For example, user data indicating that a user is a schoolteacher could have an influence factor associated with it of "exposure to children", since exposure to children is a possible consequence of being a schoolteacher.

In an additional example, a system could analyze a corpus and determine from various medical texts and other data that a condition of a gastro-intestinal discomfort could have an influence factor of eating food in a developing country. Further the system could analyze the set of user data and identify a subset of the user data corresponding with travel to a developing country. For example, the system could identify a trip from the user's social media page and/or bank accounts showing purchases in developing countries. Described further herein, the system can use natural language processing techniques to analyze user data and identify data which is associated with one or more of the influence factors.

The method can include establishing, based on the identified influence factors, a set of influence relationships between the subset of the set of user data and the subset of the set of conditions. Described further herein, an influence relationship can be a composite of influence factors for data. For example, one or more influence factors could exist between elements of the set of user data and the set of conditions. The influence relationship could be a composite of the one or more influence factors for those elements.

Referring now to FIG. 1 a block diagram of an example computing environment 100 for use with a QA system can be seen, according to embodiments of the present disclosure. In some embodiments, the computing environment 100 can include one or more remote devices 102, 112 and one or more host devices 122. Remote devices 102, 112 and host device 122 can be distant from each other and communicate over a network 150. In embodiments, the host device 122 can be a central hub from which remote devices 102, 112 establish a communication connection. In embodiments, the host device and remote devices can be configured in various suitable relationships (e.g., in a peer-to-peer or other relationship).

In some embodiments, the network 150 can be implemented by suitable communications media (e.g., wide area network (WAN), local area network (LAN), Internet, and Intranet). In some embodiments, remote devices 102, 112 and host devices 122 can be local to each other, and communicate via appropriate local communication medium (e.g., local area network (LAN), hardwire, wireless link, Intranet). In some embodiments, the network 150 can be implemented within a cloud computing environment, or using one or more cloud computing services. Consistent with various embodiments, a cloud computing environment can include a network-based, distributed data processing system that provides one or more cloud computing services. In some embodiments, 122 may be hosted in a cloud environment, and may be hosted on a Virtual Machine running in the cloud. Further, a cloud computing environment can include multiple computers (e.g., hundreds or thousands of them or more), among one or more data centers and configured to share resources over the network 150.

In some embodiments, host device 122 can include a QA system 130 having a search application 134 and an answer module 132. The search application 134 can be configured to search one or more databases or other computer systems for content that is related to an input query submitted by a user at a remote device 102, 112.

In some embodiments, remote devices 102, 112 can enable users to submit input queries (e.g., search requests or other user queries) to host devices 122 to retrieve search results. For example, the remote devices 102, 112 can include a query module 110, 120 (e.g., in the form of a web browser or other suitable software module) and present a graphical user interface or other interface (command line prompts, menu screens, etc.) to solicit queries from users for submission to one or more host devices 122 and to display answers/results obtained from the host devices 122 in relation to such user queries.

Consistent with various embodiments, host device 122 and remote devices 102, 112 can be computer systems, and can each be equipped with a display or monitor. The computer systems can include at least one processor 106, 116, 126; memories 108, 118, 128; internal or external network interface or communications devices 104, 114, 124 (e.g., modem, network interface cards); optional input devices (e.g., a keyboard, mouse, touchscreen, or other input device); and commercially available or custom software (e.g., browser software, communications software, server software, natural language processing software, search engine and/or web crawling software, filter modules for filtering content based upon predefined criteria). In some embodiments, the computer systems can include servers, desktops, laptops, and hand-held devices. In addition, the answer module 132 can include one or more modules or units to perform the various functions of embodiments as described below, and can be implemented by a combination of software and/or hardware modules or units.

Figure 2:
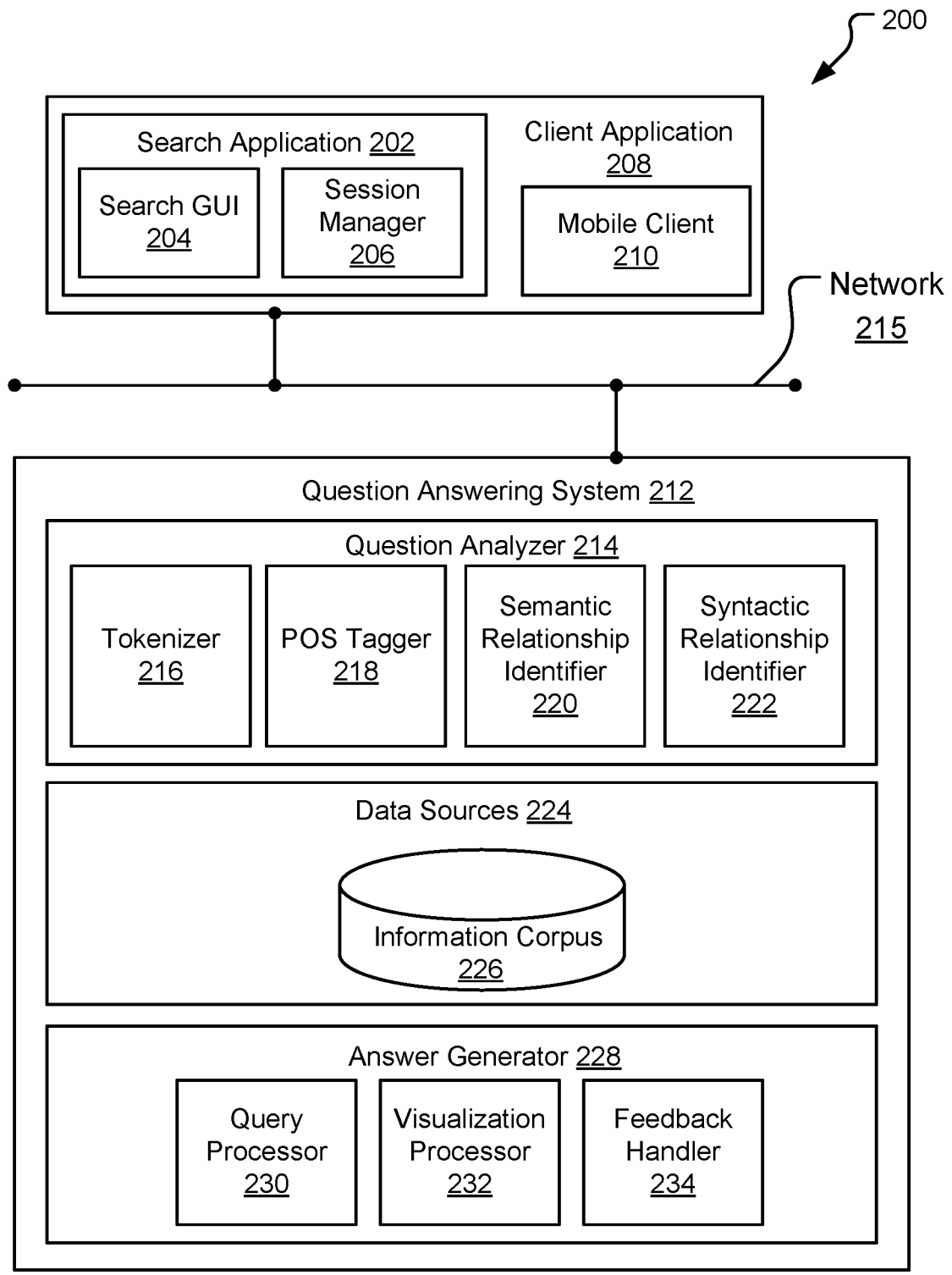
FIG. 2 depicts a block diagram of an example QA system configured to generate answers in response to one or more input queries, according to embodiments of the present disclosure.

Referring now to FIG. 2 a block diagram of a QA system can be seen, according to embodiments of the present disclosure. Aspects of FIG. 2 are directed toward a system architecture 200, including a QA system 212 to generate a group of answers (e.g., one or more answers) in response to an input query. In some embodiments, one or more users can send requests for information to QA system 212 using a remote device (such as remote devices 102, 112 of FIG. 1). The remote device can include a client application 208 which can include one or more entities operable to generate information that is dispatched to QA system 212 via network 215. QA system 212 can be able to perform methods and techniques for responding to the requests sent by the client application 208. In some embodiments, the information received at QA system 212 can correspond to input queries received from users, where the input queries can be expressed in natural language, or images, or other forms.

An input query (similarly referred to herein as a question) can be one or more words that form a search term or request for data, information, or knowledge. A question can be expressed in the form of one or more keywords. Questions can include various selection criteria and search terms. A question can be composed of complex linguistic features in addition to keywords. However, a keyword-based search for answers can also be possible. In some embodiments, using restricted syntax for questions posed by users can be enabled. The use of restricted syntax can result in a variety of alternative expressions that assist users in better stating their needs. In some embodiments, questions can be implied (rather than explicit) questions. Furthermore, in some embodiments, questions can be audio-type (e.g., spoken-word recordings, music, scientific sound recordings), video-type (e.g., a film, a silent movie, a video of a person asking a detailed question), image-type (e.g., a picture, a photograph, a drawing), or other type that can be received and processed by the QA system.

In some embodiments, client application 208 can operate on a variety of devices. Such devices can include, but are not limited to, mobile and hand-held devices (e.g., laptops, mobile phones, personal or enterprise digital assistants, and the like), personal computers, servers, or other computer systems that can access the services and functionality provided by QA system 212. In some embodiments, client application 208 can include one or more components, such as a mobile client 210. Mobile client 210, acting as an agent of client application 208, can dispatch user query requests to QA system 212.

Consistent with various embodiments, client application 208 can also include a search application 202, either as part of mobile client 210 or separately, that can perform several functions, including some or all of the above functions of mobile client 210 listed above. For example, in some embodiments, search application 202 can dispatch requests for information to QA system 212. In some embodiments, search application 202 can be a client application to QA system 212. Search application 202 can send requests for answers to QA system 212. Search application 202 can be installed on a personal computer, a server, or other computer system.

In some embodiments, search application 202 can include a search graphical user interface (GUI) 204 and session manager 206. In such situations, users can be able to enter questions in search GUI 204. In some embodiments, search GUI 204 can be a search box or other GUI component, the content of which can represent a question to be submitted to QA system 212. Users can authenticate to QA system 212 via session manager 206. In some embodiments, session manager 206 can keep track of user activity across sessions of interaction with the QA system 212. Session manager 206 can also keep track of what questions are submitted within the lifecycle of a session of a user. For example, session manager 206 can retain a succession of questions posed by a user during a session. In some embodiments, answers produced by QA system 212 in response to questions posed throughout the course of a user session can also be retained. Information for sessions managed by session manager 206 can be shared between various computer systems and devices.

In some embodiments, client application 208 and QA system 212 can be communicatively coupled through network 215, e.g., the Internet, intranet, or other public or private computer network. In some embodiments, QA system 212 and client application 208 can communicate by using Hypertext Transfer Protocol (HTTP) or Representational State Transfer (REST) calls. In some embodiments, QA system 212 can reside on a server node. Client application 208 can establish server-client communication with QA system 212 or vice versa. In some embodiments, the network 215 can be implemented within a cloud computing environment, or using one or more cloud computing services.

Consistent with various embodiments, QA system 212 can respond to a request for information sent by client applications 208 (e.g., question posed by a user). QA system 212 can generate a group of answers in response to the request. In some embodiments, QA system 212 can include a question analyzer 214, data sources 224, and answer generator 228. Question analyzer 214 can be a computer module that analyzes the received questions. Question analyzer 214 can perform various methods and techniques for analyzing the questions (syntactic analysis, semantic analysis, image recognition analysis, etc.). In some embodiments, question analyzer 214 can parse received questions. Question analyzer 214 can include various modules to perform analyses of received questions. For example, computer modules that question analyzer 214 can encompass include, but are not limited to, a tokenizer 216, part-of-speech (POS) tagger 218, semantic relationship identifier 220, and syntactic relationship identifier 222.

In some embodiments, tokenizer 216 can be a computer module that performs lexical analysis. Tokenizer 216 can convert a sequence of characters into a sequence of tokens. A token can be a string of characters typed by a user and categorized as a meaningful symbol. Further, in some embodiments, tokenizer 216 can identify word boundaries in an input query and break the question or text into its component parts such as words, multiword tokens, numbers, and punctuation marks. In some embodiments, tokenizer 216 can receive a string of characters, identify the lexemes in the string, and categorize them into tokens.

Consistent with various embodiments, POS tagger 218 can be a computer module that marks up a word in a text to correspond to a particular part of speech. POS tagger 218 can read a question or other text in natural language and assign a part of speech to each word or other token. POS tagger 218 can determine the part of speech to which a word corresponds based on the definition of the word and the context of the word. The context of a word can be based on its relationship with adjacent and related words in a phrase, sentence, question, or paragraph. In some embodiments, the context of a word can be dependent on one or more previously posed questions. Examples of parts of speech that can be assigned to words include, but are not limited to, nouns, verbs, adjectives, adverbs, and the like. Examples of other part of speech categories that POS tagger 218 can assign include, but are not limited to, comparative or superlative adverbs, wh-adverbs, conjunctions, determiners, negative particles, possessive markers, prepositions, wh-pronouns, and the like. In some embodiments, POS tagger 218 can tag or otherwise annotate tokens of a question with part of speech categories. In some embodiments, POS tagger 218 can tag tokens or words of a question to be parsed by QA system 212.

In some embodiments, semantic relationship identifier 220 can be a computer module that can identify semantic relationships of recognized entities (e.g., words, phrases) in questions posed by users. In some embodiments, semantic relationship identifier 220 can determine functional dependencies between entities and other semantic relationships.

Consistent with various embodiments, syntactic relationship identifier 222 can be a computer module that can identify syntactic relationships in a question composed of tokens posed by users to QA system 212. Syntactic relationship identifier 222 can determine the grammatical structure of sentences, for example, which groups of words are associated as "phrases" and which word is the subject or object of a verb. Syntactic relationship identifier 222 can conform to formal grammar.

In some embodiments, question analyzer 214 can be a computer module that can parse a received user query and generate a corresponding data structure of the user query. For example, in response to receiving a question at QA system 212, question analyzer 214 can output the parsed question as a data structure. In some embodiments, the parsed question can be represented in the form of a parse tree or other graph structure. To generate the parsed question, question analyzer 214 can trigger computer modules 216-222. Additionally, in some embodiments, question analyzer 214 can use external computer systems for dedicated tasks that are part of the question parsing process.

In some embodiments, the output of question analyzer 214 can be used by QA system 212 to perform a search of a set of (i.e., one or more) corpora to retrieve information to answer a question posed by a user. As used herein, a corpus can refer to one or more data sources. In some embodiments, data sources 224 can include databases, information corpora, data models, and document repositories. In some embodiments, the data source 224 can include an information corpus 226. The information corpus 226 can enable data storage and retrieval. In some embodiments, the information corpus 226 can be a storage mechanism that houses a standardized, consistent, clean and integrated form of data. The data can be sourced from various operational systems. Data stored in the information corpus 226 can be structured in a way to specifically address reporting and analytic requirements. In some embodiments, the information corpus can be a relational database. In some example embodiments, data sources 224 can include one or more document repositories.

In some embodiments, answer generator 228 can be a computer module that generates a group of answers in response to posed questions. Examples of answers generated by answer generator 228 can include, but are not limited to, natural language sentences, reports, charts, or other analytic representation, raw data, web pages, and the like. In some embodiments, answers can be of audio type, image type, or other suitable medium type.

In some embodiments, answer generator 228 can include query processor 230, visualization processor 232, and feedback handler 234. When information in the data source 224 matching a parsed question is located, a technical query associated with the pattern can be executed by query processor 230. Based on data retrieved by a technical query executed by query processor 230, visualization processor 232 can be configured to render visualization of the retrieved answers as described herein. The rendered visualization of the answers can represent the answer to the input query. In some embodiments, visualization processor 232 can render visualization in various forms including, but not limited to, images, charts, tables, dashboards, maps, and the like.

In some embodiments, feedback handler 234 can be a computer module that processes feedback from users on answers generated by answer generator 228. In some embodiments, users can be engaged in dialog with the QA system 212 to evaluate the relevance of received answers. For example, the answer generator 228 could produce the group of answers corresponding to a question submitted by a user. The user could rank each answer according to its relevance to the question. In some embodiments, the feedback of users on generated answers can be used for future question answering sessions.

The various components of the QA system 212 described herein can be used to implement various aspects of the present disclosure. For example, the client application 208 could be used to receive an input query from a user. The question analyzer 214 could, in some embodiments, be used to analyze input queries. In embodiments, the input queries can include a question asking for explanations for a set of conditions. The answer generator 228, in embodiments, could be used to analyze the data sources 224 to determine influence factors between user data in the information corpus 226 and one or more of the set of conditions.

Figure 3:
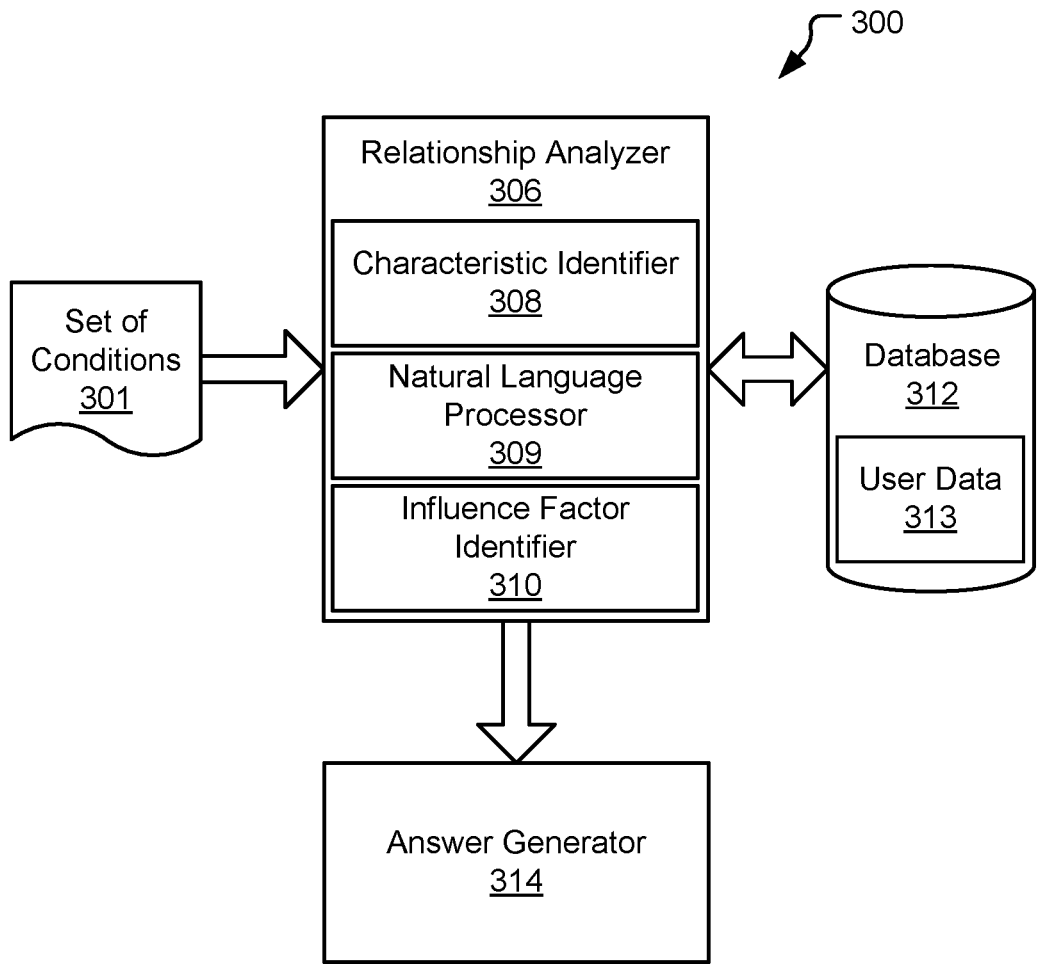
FIG. 3 depicts an example system architecture configured to establish a set of influence relationships between data, according to embodiments of the present disclosure.

Referring now to FIG. 3 a block diagram of a system architecture 300 for establishing influence relationships between data in a question-answering environment can be seen, according to embodiments of the present disclosure. In embodiments, the system architecture 300 can represent an example architecture for executing embodiments of the present disclosure. For example, in some instances, the system architecture 300 could be an example representation of aspects of the answer generator 228 (FIG. 2) and/or the question analyzer 214 (FIG. 2).

In embodiments, the system architecture 300 can include a relationship analyzer 306 and an answer generator 314.

The relationship analyzer 306 can be a computer module configured to establish influence relationships between data in a QA environment. In embodiments, the relationship analyzer 306 can be configured to determine a set of conditions 301. The set of conditions 301 can be the same or substantially similar as described herein. In embodiments, the relationship analyzer can receive the set of conditions 301 as inputs. For example, in embodiments a user could enter the set of conditions manually as text. The relationship analyzer 306 could then use natural language processing techniques as described herein to parse the text to determine the set of conditions 301.

Relationship analyzer 306 can be communicatively connected to database 312. Database 312 can store various types of information including text, images, audio, video, and other suitable information. In embodiments, database can include a mass quantity of various kinds of data related to various subjects. For example in embodiments, the database could include various medical information including journals, medical texts, clinical research, doctor's notes, and other information. In embodiments, the database 312 could include information related to various additional subject matter. The database 312 can be accessed and parsed by the relationship analyzer 306 to establish relationships between data based on the stored information.

In embodiments, database 312 can be a corpus of information. In some embodiments, database 312 can substantially correspond to information corpus 226 (FIG. 2). In embodiments database 312 can include a set of user data 313. User data can be the same or substantially similar as described herein. For example, in embodiments, the set of user data 313 includes one or more types of content including economic data, medical data, personal data, family history, and historical user data.

In embodiments, the relationship analyzer 306 can include a characteristic identifier 308. The characteristic identifier 308 can be configured to identify characteristics of the set of conditions 301 and in the set of user data 313. In embodiments, characteristics are elements, features, traits, themes, etc. that can be related to or correspond to data. For example, a condition of the common cold could have characteristics including, but not limited to, "contagious", "sore throat", "nasal congestion", and "common in children". In an additional example, user data indicating travel abroad could have characteristics including but not limited to, "exposure to people", "stress", and "unusual food and beverage". Described further herein, characteristic relationships can be used to establish influence factors and influence relationships between two or more pieces of data.

In embodiments, the characteristic identifier 308 can identify characteristics in data using natural language processing techniques as described herein. For example, in embodiments, the characteristic identifier 308 can employ a natural language processor 309. The natural language processor 309 can be configured to perform various methods and techniques for natural language analysis of data in the QA environment. For example, the natural language processor 309 can be configured to perform syntactic analysis, semantic analysis, image recognition analysis, concept matching and other suitable methods and techniques.

In embodiments, characteristics can be determined by concept matching techniques. Concept matching techniques can include, but are not limited to, semantic similarity analysis, syntactic analysis, and ontological matching. For example, in embodiments, the natural language processor 309 could be configured to parse data in the QA environment to determine semantic features (e.g., repeated words and/or keywords) and/or syntactic features (e.g., location of semantic features in headings and/or title). Ontological matching could be used to map semantic and/or syntactic features to a particular concept.

For example, in some embodiments, the natural language processor 309 can be configured to parse the database 312, the set of user data 313, and the set of conditions 301. The natural language processor 309 could identify, in the data, repeated words corresponding to a particular concept. Additionally, the natural language processor 309 could identify the location of the repeated words in headings and titles, which can indicate the relative importance of the repeated words. Based on the semantic and syntactic features the natural language processor 309 could map a subset of the set of user data 313 and a subset of the set of conditions 301 to various concepts. In embodiments, the characteristic identifier 308 could be configured to select the concepts as characteristics.

For example, in embodiments, a QA system could receive a question asking for possible causes in user data for a set of conditions including a common cold, and paresthesia (tingling sensation) in appendages. In response, characteristic identifier 308, using natural language processor 309, could parse the set of conditions 301 and the database 312 to determine characteristics of the set of conditions 301. Based on concept matching techniques, the natural language processor could identify various concepts from a corpus, such as the database 312, corresponding to the common cold. For example, in the natural language processor could identify in various medical texts that exposure to young children can increase the chances of contracting the common cold. The natural language processor 309 could then select "exposure to children" as the concept. Similarly, in some examples, the natural language processor 309 could identify from medical journals or other sources that high stress levels can result in paresthesia. Thus, the natural language processor 309 could select "stress" as another concept. Thus, in embodiments, the characteristic identifier 308 could be configured to select the concept of "stress" as a characteristic of paresthesia and the concept of "exposure to children" as a characteristic of the common cold.

In embodiments, the characteristic identifier 308 could parse the set of user data and identify characteristics of the set of user data. For example, the characteristic identifier 308 could parse financial records, such as paystubs and tax information that shows that the user works at an elementary school and has been putting in overtime. As described herein, the natural language processor 309 could identify "exposure to children" and "stress" as concepts from analysis of this information. Thus, the characteristic identifier 308 could select the concepts of "stress" and "exposure to children" as characteristics of a subset of the user data.

The influence factor identifier 310 can be configured to identify influence factors between data in the QA environment. The influence factor identifier 310 can be configured to identify influence factors based on comparing characteristics identified by the characteristic identifier 308. In embodiments, comparisons can be made between data having common (e.g., shared) characteristics and different (e.g., non-shared) characteristics. Based on the comparisons of these characteristic relationships, the influence factor identifier can identify influence factors between data. In embodiments, if characteristics are the same or substantially similar then the influence factor identifier can identify the characteristics as one or more influence factors.

In embodiments, the influence factor identifier 310 can use natural language processor 309 to compare characteristics. In embodiments, natural language processor 309 can use various techniques such as syntactic analysis, semantic analysis, image recognition analysis, concept matching and other suitable methods and techniques as described herein.

In embodiments, natural language processor can determine whether characteristics are the same or substantially similar. In embodiments, characteristics are substantially similar if they are identical. In some embodiments, characteristics are substantially similar if they are related. For example, in embodiments, related characteristics could be a first characteristic describing a genus and a second characteristic describing a species of that genus. For example, if a characteristic of the common cold was "exposure to children" and a characteristic of user data was "exposure to people", the concepts could be considered substantially similar as "exposure to people" includes the characteristic of "exposure to children".

In some embodiments, the characteristics can be weighted. Similarly, the influence factors identified from the characteristics can be weighted based on the weights of the characteristics. For example, in embodiments, an influence factor identified from a highly weighted characteristic will be a highly weighted influence factor. In embodiments, the characteristics can be weighted based on the source of the characteristic, such as type of user data. For example, in embodiments, if a characteristic was parsed from financial data it could have an assigned weight based on that the characteristic was located from financial data. In an additional, characteristics from financial data could have higher weights than characteristics from other types of data, such as social networking data. In some embodiments, characteristics can be weighted based on the format of the user data. For example, characteristics parsed from textual data could be weighed higher than audio data. Further, in some embodiments, the influence factor could be weighted based on the NLP analysis that detected the characteristic. For example, in embodiments, NLP could detect urgency which could give the characteristic a higher weight. For example, a high urgency characteristic could be parsed from a social network data that says "wow! I really feel sick after eating at that restaurant!"

In some embodiments, influence factor identifier 310 can be configured to group influence factors based on a data pair to which each influence factor belongs. For example, in a situation having a set of conditions including conditions A, B, and C, and a set of user data including user data D and E, there can be, in some embodiments, as many as six different answer pairs (A-D, A-E, B-D, B-E, C-D, and C-E) and, therefore, as many as six different sets of influence factors.

In embodiments, the relationship analyzer 306 can be configured to establish influence relationships using a set of influence factors. Each influence relationship can represent a composite of a particular set of influence factors. In some embodiments, influence relationships can be measures or indicators as to how datum of a data pair are likely to interact or influence each other. Further, in some embodiments, for data pairs having no influence factors, there can be deemed to be no influence relationship between those answers forming the pair or there can be deemed to be a null or neutral influence relationship. For instance, if there are no influence factors corresponding to the A-D pair then the relationship between condition A and user data D could be deemed a neutral influence relationship.

In embodiments, the relationship analyzer 306 can be configured to evaluate influence relationships. In embodiments, the relationship analyzer 306 can be configured to evaluate the influence relationships by calculating a relationship score that indicates the relative strength of the influence relationship. In some embodiments, the calculated relationship score can be based on the number of influence factors that make up the influence relationship. For example, in embodiments, the relationship analyzer 306 can be configured to determine the number of influence factors that make up the influence relationship. In some embodiments, the greater the number of influence factors that make up the influence relationship, the stronger the influence relationship. Similarly, the fewer the number of influence factors, the weaker the influence relationship. In some embodiments, the strength of the inverse relationship can be inversely proportional to the number of influence factors in the influence relationship. In some embodiments, the relationship score can be based on the weight of the influence factors, as described herein. For example, in embodiments, the higher the weight of the influence factors in the influence relationship, the greater the relationship score. In some embodiments, the relationship score can be inversely proportional to the weight of the influence factors in the influence relationship.

The answer generator 314 can be configured to generate answers based on influence relationships. For example, in response to a question about how two sets of data influence each other, the answer generator could generate one or more explanations detailing the influence relationships established by the relationship analyzer 306. For example, the answer generator could present text describing that an influence relationship between working as a schoolteacher and the common cold was obtained. In embodiments, the answer generator could include evidence used to arrive at the influence relationship. For example, the answer generator could present elements in the database 312 used to establish the influence relationship.

For example, in embodiments, the answer generator 314 can be configured to generate text based explanations of the influence relationship. In some embodiments, explanations can be generated in various formats including images, text, audio, video, tables, charts, and in other suitable formats. In embodiments, answer generator 314 can be configured to use natural language processing techniques as described herein, to generate the explanations.

Figure 4:
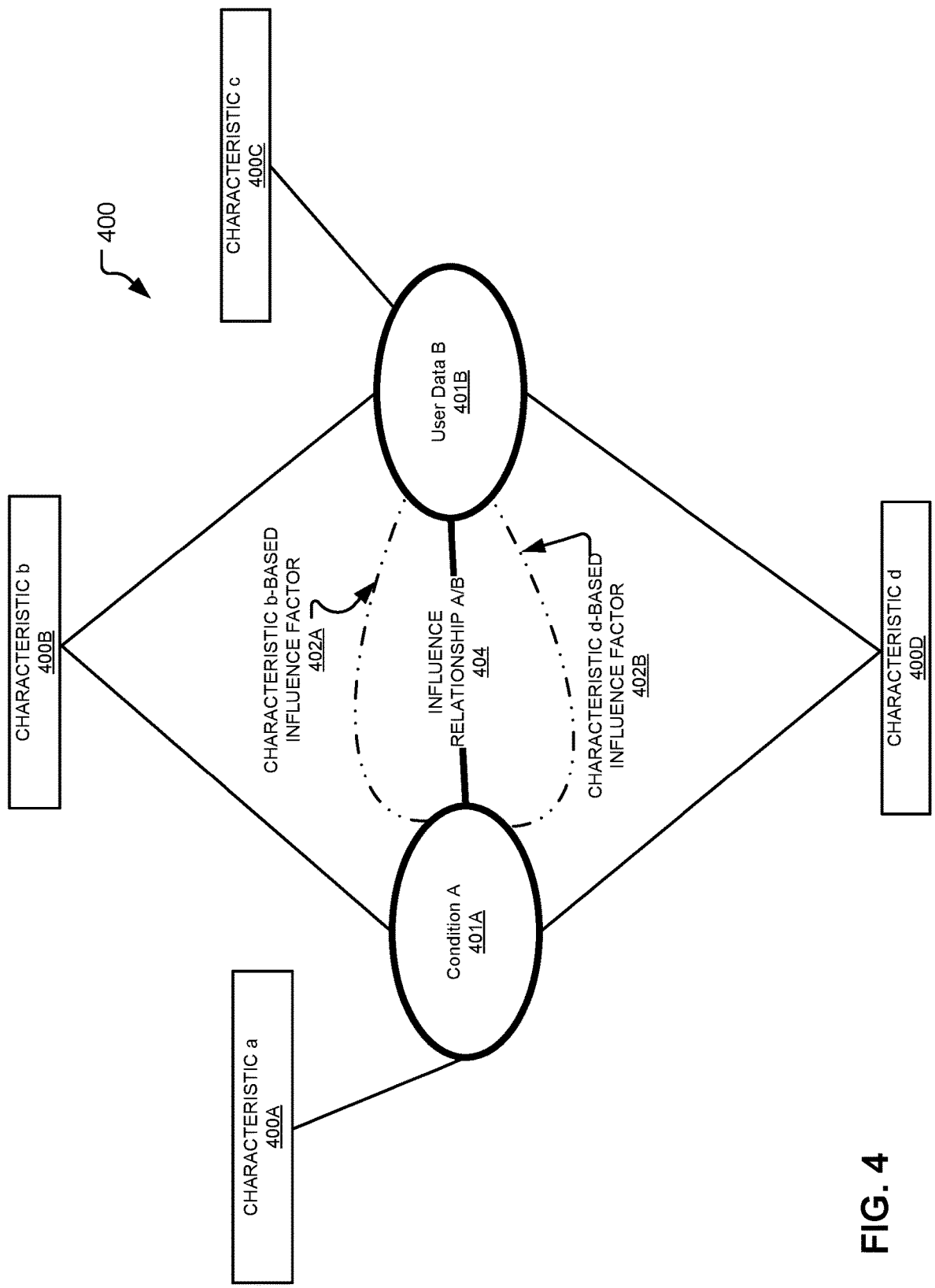
FIG. 4 depicts a diagram of influence factors and influence relationships between data in a question-answering environment, according to embodiments of the present disclosure.

Referring now to FIG. 4, an example diagram 400 of data relationships between data in a QA environment can be seen, according to embodiments of the present disclosure. As seen in FIG. 4, example diagram 400 includes two types of data including condition A 401A and user data B 401B. In embodiments, various amounts of data can be compared for data relationships. As described herein, diagram 400 could be a representation of a QA system's response to a question of how types of data influence one another (such as condition A 401A and user data B 401B).

As seen in FIG. 4, an influence relationship A/B 404 exists corresponding to condition A 401A and user data B 401B. As described herein, influence relationship A/B 404 can be a composite of one or more influence factors. As seen in FIG. 4, there are two influence factors corresponding to condition A 401A and user data B 401B (characteristic b-based influence factor 402A and characteristic d-based influence factor 402B).

As described herein, influence factors can be based on characteristics (a, b, c, and d). Characteristics can be associated with the data as described herein. For example, condition A 401A is associated with characteristic a 400A, b 400B, and d 400D. User data B 401B is associated with characteristics b 400B, c 400C, and d 400D. Two characteristics are common characteristics (b and d, respectively) which is indicated by lines from condition A 401A and user data B 401B to characteristic b 400B and d 400D. By comparing these characteristics as described herein, two characteristic based influence factors can be identified, namely, characteristic b-based influence factor 402A corresponding to both condition A 401A and user data B 401B and characteristic d-based influence factor 402B corresponding to both condition A 401A and user data B 401B.

Further, as shown, influence relationship A/B 404 can be generated based on the sets of influence factors. Specifically, a first influence relationship (including the characteristic b-based influence factor and characteristic d-based influence factor) can be used to generate an influence relationship A/B 404 between condition A 401A and user data B 401B.

Figure 5:
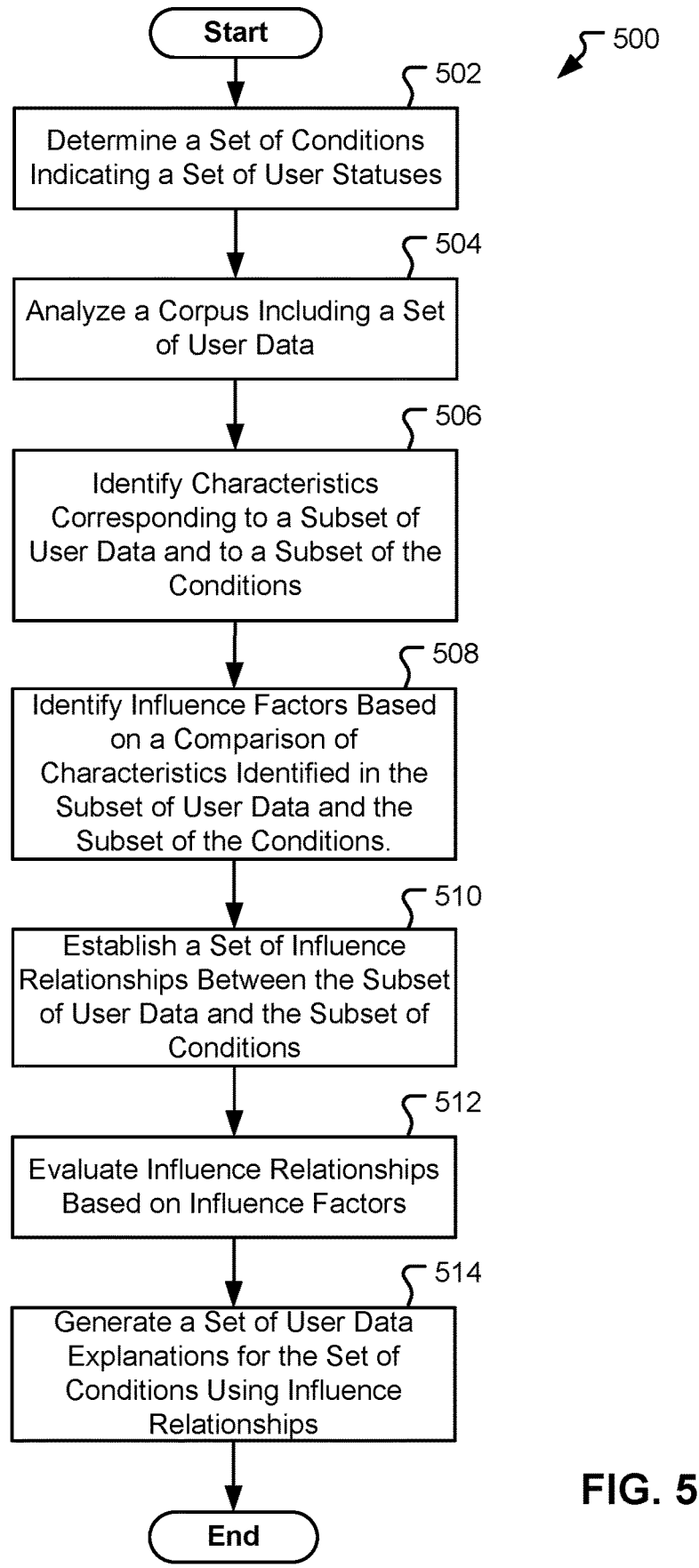
FIG. 5 depicts a flowchart diagram of a method of establishing influence relationships between data in a question-answering environment, according to embodiments of the present disclosure.

Referring now to FIG. 5 a flowchart diagram of a method 500 of establishing influence relationships between data in a question-answering environment can be seen, according to embodiments of the present disclosure.

In operation 502, a set of conditions can be determined that indicate a set of user statuses. The set of conditions can be the same or substantially similar as described herein. In embodiments, the set of conditions can be various statuses for a user. For example, in the medical field, the set of conditions could include various illnesses and/or symptoms. In operation 504, a corpus can be analyzed that includes a set of user data. The corpus can be the same or substantially similar as described herein. In embodiments, the corpus includes mass quantities of information on various subject matter. The set of user data can be the same or substantially similar as described herein. In embodiments, the set of user data can include various types of electronic information accessible by a QA system for analysis.

In operation 506, characteristics can be identified that correspond to a subset of user data and to a subset of the conditions to identify influence factors. Characteristics can be the same or substantially similar as described herein. In embodiments, characteristics can be identified using natural language processing techniques. For example, in embodiments, concept matching techniques, as described herein, can be used to identify characteristics.

In operation 508, a set of influence factors can be identified based on a comparison of characteristics. Influence factors can be the same or substantially similar as described herein. In embodiments, the set of influence factors can be identified by determining that characteristics corresponding to the subset of user data and the subset of conditions are substantially similar.

In operation 510, a set of influence relationships can be established based on the set of influence factors. Influence relationships can be the same or substantially similar as described herein. In embodiments, influence relationships can be composites of groups of influence factors. In operation 512, the method 500 can include evaluating the influence relationships based on the influence factors. In embodiments, the influence relationships can be evaluated by calculating a relationship score that indicates the relative strength of the influence relationship. In some embodiments, the calculated relationship score can be based on the number of influence factors that make up the influence relationship. For example, in embodiments, the relationship analyzer 306 can be configured to determine the number of influence factors that make up the influence relationship. In some embodiments, the greater the number of influence factors that make up the influence relationship, the stronger the influence relationship. Similarly, the fewer the number of influence factors, the weaker the influence relationship. In some embodiments, the relationship score can be based on the weight of the influence factors, as described herein. For example, in embodiments, the higher the weight of the influence factors in the influence relationship, the greater the relationship score.

In operation 514, the method can include generating a set of explanations for the set of conditions using relevant influence relationships. In embodiments, the set of explanations can be text based descriptions of the influence relationships established by embodiments of the present disclosure. For example, an explanation could include text describing that an influence relationship between working as a schoolteacher and the common cold was obtained.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method of establishing influence relationships between data in a question-answering environment, the method comprising:

receiving an electronic text document from a user over a network;

parsing, using a natural language processor, the electronic text document to determine a set of conditions indicating a set of user statuses, wherein parsing, using the natural language processor, the electronic text document to determine the set of conditions includes:
converting sequences of characters within the electronic text document into tokens;
determining a set of repeated words in the electronic text document;
determining a location of each of the repeated words in the set of repeated words; and
selecting, based on the location of each of the repeated words of the set of repeated words, a subset of repeated words, wherein the set of conditions are selected based on the subset of repeated words;

accessing, over the network, a corpus of data including a set of user data;

analyzing, using the natural language processor, the corpus of data including the set of user data;

identifying, based on analyzing the corpus of data, a set of influence factors corresponding to a subset of the set of user data and to a subset of the set of conditions, wherein identifying the set of influence factors corresponding to the subset of the set of user data and to the subset of the set of conditions includes:
identifying, by the natural language processor, a first characteristic of a first data type of the subset of the set of user data, the first data type in a first format;
assigning a first weight to the first characteristic based on the first data type and the first format;
identifying, by the natural language processor, a second characteristic of a second data type of the subset of the set of user data, the second data type in a second format;
assigning a second weight to the second characteristic based on the second data type and the second format;
identifying a first influence factor of the set of influence factors using the first characteristic and the second characteristic; and
assigning a third weight to the first influence factor based on the first weight of the first characteristic and the second weight of the second characteristic;

establishing, based on the set of influence factors, a set of influence relationships between the subset of the set of user data and the subset of the set of conditions, wherein a first influence relationship is established using the first influence factor; and generating an explanation for the subset of conditions using at least the first influence relationship based on the third weight of the first influence factor.

2. A system for establishing influence relationships between data in a question-answering environment, the system comprising:

a processor; and a computer readable storage medium having program instructions embodied therewith, the program instructions executable by the processor to cause the system to:

receive an electronic text document from a user over a network;

parse, using a natural language processor, the electronic text document to determine a set of conditions indicating a set of user statuses, wherein parsing, using the natural language processor, the electronic text document to determine the set of conditions includes:

converting sequences of characters within the electronic text document into tokens;

determining a set of repeated words in the electronic text document;

determining a location of each of the repeated words in the set of repeated words; and selecting, based on the location of each of the repeated words of the set of repeated words, a subset of repeated words, wherein the set of conditions are selected based on the subset of repeated words;

access, over the network, a corpus of data including a set of user data;

analyze, using the natural language processor, the corpus of data including the set of user data;

identify, based on analyzing the corpus of data, a set of influence factors corresponding to a subset of the set of user data and to a subset of the set of conditions, wherein identifying the set of influence factors corresponding to the subset of the set of user data and to the subset of the set of conditions includes:

identifying, by the natural language processor, a first characteristic of a first data type of the subset of the set of user data, the first data type in a first format;

assigning a first weight to the first characteristic based on the first data type and the first format;

identifying, by the natural language processor, a second characteristic of a second data type of the subset of the set of user data, the second data type in a second format;

assigning a second weight to the second characteristic based on the second data type and the second format;

identifying a first influence factor of the set of influence factors using the first characteristic and the second characteristic; and assigning a third weight to the first influence factor based on the first weight of the first characteristic and the second weight of the second characteristic;

establish, based on the set of influence factors, a set of influence relationships between the subset of the set of user data and the subset of the set of conditions, wherein a first influence relationship is established using the first influence factor; and generate an explanation for the subset of conditions using at least the first influence relationship based on the third weight of the first influence factor.

3. A computer program product for establishing influence relationships between data in a question-answering environment, the computer program product comprising a computer readable storage medium having program instructions embodied therewith, the program instructions executable by a computer to cause the computer to perform a method comprising:

receiving an electronic text document from a user over a network;

parsing, using a natural language processor, the electronic text document to determine a set of conditions indicating a set of user statuses, wherein parsing, using the natural language processor, the electronic text document to determine the set of conditions includes:

converting sequences of characters within the electronic text document into tokens;

determining a set of repeated words in the electronic text document;

determining a location of each of the repeated words in the set of repeated words; and selecting, based on the location of each of the repeated words of the set of repeated words, a subset of repeated words, wherein the set of conditions are selected based on the subset of repeated words;

accessing, over the network, a corpus of data including a set of user data;

analyzing, using the natural language processor, the corpus of data including the set of user data;

identifying, based on analyzing the corpus of data, a set of influence factors corresponding to a subset of the set of user data and to a subset of the set of conditions, wherein identifying the set of influence factors corresponding to the subset of the set of user data and to the subset of the set of conditions includes:

identifying, by the natural language processor, a first characteristic of a first data type of the subset of the set of user data, the first data type in a first format;

assigning a first weight to the first characteristic based on the first data type and the first format;

identifying, by the natural language processor, a second characteristic of a second data type of the subset of the set of user data, the second data type in a second format;

assigning a second weight to the second characteristic based on the second data type and the second format;

identifying a first influence factor of the set of influence factors using the first characteristic and the second characteristic; and assigning a third weight to the first influence factor based on the first weight of the first and the second weight of the second characteristic;

establishing, based on the set of influence factors, a set of influence relationships between the subset of the set of user data and the subset of the set of conditions, wherein a first influence relationship is established using the first influence factor; and generating an explanation for the subset of conditions using at least the first influence relationship based on the third weight of the first influence factor.

4. The computer program product of claim 3, wherein:
the set of conditions is a set of medical conditions indicating a set of medical related user statuses.

* * * * *